April 15, 1952     H. M. SCHUMANN     2,592,747
LATEX IMPREGNATED LUFFA AND METHOD
OF PREPARING THE SAME
Filed March 30, 1949     2 SHEETS—SHEET 1

Inventor
Hans Maassen Schumann
By Lynnestvedt & Lechner
Attys

Patented Apr. 15, 1952

2,592,747

UNITED STATES PATENT OFFICE 2,592,747

LATEX IMPREGNATED LUFFA AND METHOD OF PREPARING THE SAME

Hans Maassen Schumann, Philadelphia, Pa.

Application March 30, 1949, Serial No. 84,325

12 Claims. (Cl. 154—140)

This invention relates to a method of preparing the vascular tissue of the pericarpial skeleton of a plant of the genus Luffa for the purpose of providing a porous material which is unusually light in weight, extremely resilient and elastic and remarkably tough and resistant to wear and which can be easily shaped and set to any desired conformation or configuration and which will retain its set and, if distorted, will return to its form even under conditions where it is subjected to repeated regular or irregular pressures. Both the method and the finished article are believed to be novel as defined in the appended claims.

Before proceeding with a detailed description of my invention it will be helpful to explain that Luffa is a herbaceous plant of the gourd family and that the present invention has to do particularly with the fibrous skeletons of these plants which are of generally cylindrical or elongated pear shape and the principal varieties of which are known as *Luffa aegyptiana*, *Luffa cylindrica* and *Luffa acutangula*. The fibrous vascular tissue of the pericarp of these plants is available in commerce and the skeletons are generally transported as dry, flat, compressed pieces which, when placed in water, will quickly regain or reassume their natural form. It might also be noted that the fibrous skeleton is referred to under several different spellings of the word Luffa such for example as loofah and loofa.

With the foregoing in mind it can be said that it is the object of my invention to provide a light weight, porous, resilient, elastic and tough fabric of relatively coarse quality which can be used in fabricating or manufacturing all kinds of articles where such qualities are desired and wherein the material is to be shaped and set to any desired conformation or configuration and which will retain its set and return to its form even under conditions where it is repeatedly distorted. One outstanding example for which I have particularly developed my improved material is for use in the manufacture of tailor-made foot wear, i. e., foot wear which is shaped to the exact form of the wearer's feet. However, I wish it to be distinctly understood that the invention is in no sense to be limited to the manufacture of foot wear. This use is cited merely as a typical example.

I will now describe the invention in connection with the accompanying drawings wherein.

Figure 5:
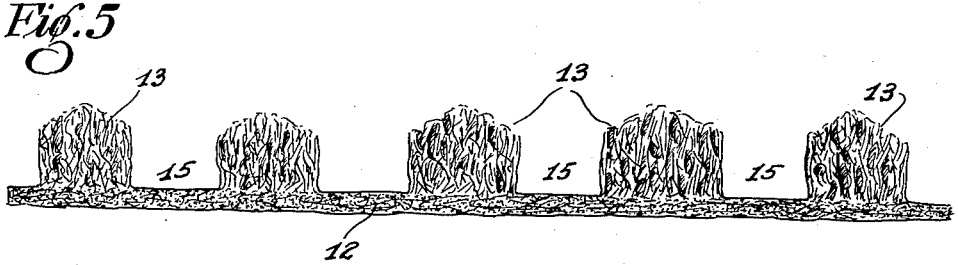
Figure 5 is a transverse section through a skeleton which has been split, flattened and dried.
Figure 6:
Figure 6 is a section similar to Figure 5 but showing the central vascular bundles of the skeleton removed so as to provide a relatively thin sheet.
Figure 7:
Figure 7 is another section similar to Figures 5 and 6 but showing only the inner portions of the central vascular bundles as being cut away, which portions have been interfitted and secured between the base or outer portions of the central bundles in order to provide a sheet of medium thickness.
Figure 8:
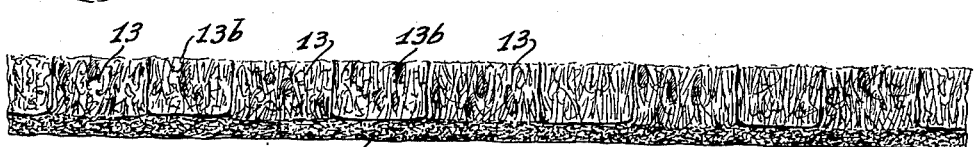
Figure 9:
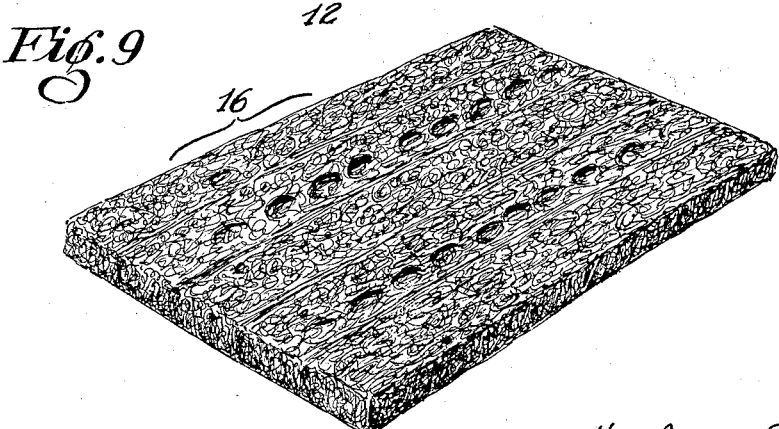

Figure 8 is another section similar to Figures 5, 6 and 7 but showing central vascular bundles taken from one pericarp and fitted between the central bundles of another skeleton in order to provide a thick or heavy sheet; and Figure 9 is a perspective view of a finished sheet cut to substantially rectangular form and which can be sold as an article of commerce for use in the manufacture or fabrication of all kinds of articles in which it is desired to incorporate the qualities provided by my invention.

Figure 1:
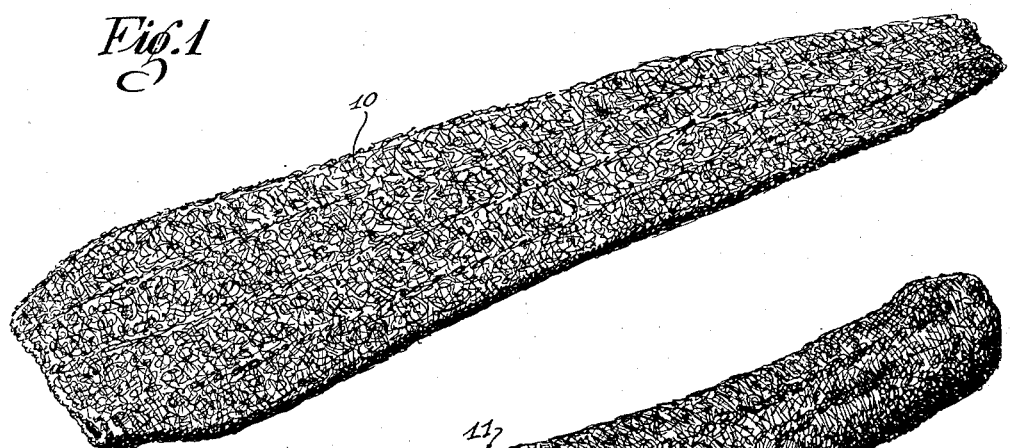
Figure 1 is a perspective view of the compressed, dry skeleton of a plant of the genus Luffa (species *Luffa cylindrica*). It is in this form that the skeletons are generally transported and made available in commerce.

The preferred method of preparing the article of my invention involves, as a first step, the thorough drying of the skeleton 10. As received in commerce these skeletons have already been dried and have been pressed flat as shown in Figure 1. If sufficiently dried, no further drying may be necessary but as a general rule in order to be sure that all possible moisture has been eliminated, I prefer to place the flat skeletons in a drying chamber which is held at a temperature somewhat above average living temperatures say, for example, about 120° F. although it is not essential to use any particular drying temperature for this step, the only limitation being that the temperature should not be high enough to damage the structure of the tissue.

Figure 2:
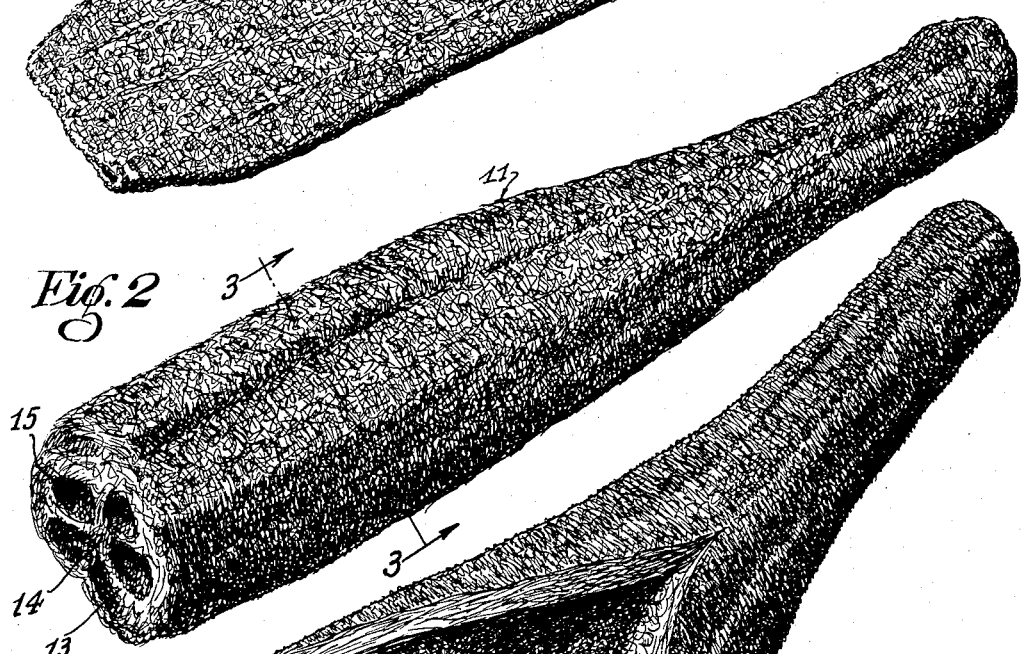
Figure 2 is a perspective view of the pericarpial skeleton in its normal or natural form.

When thoroughly dried, the skeleton is immediately impregnated with latex or material of similar characteristics, preferably by sinking or immersing it in a bath of latex whereupon the skeleton will rather rapidly regain its normal or natural form 11 as illustrated in Figure 2. This is brought about by the tremendous capacity of imbibition which is characteristic of these dried pericarps, the entire vascular tissue of which the skeleton is composed seeming to suck up or imbibe the latex with tremendous vigor which action can be furthered by a slight pressing or squeezing of the piece as it is held under the surface of the latex.

After thorough saturation with the latex at which time the skeleton has regained its natural form, it is taken out of the bath and superfluous latex is allowed to drip out following which the outer fruit wall 12 of the skeleton is cut open along one side in a longitudinal direction, the cut being made at a point between a pair of adjacent longitudinal columns or inner vascular bundles 13 of the skeleton, there being five of these bundles in the particular skeleton illustrated although, in nature, pericarps are found which have a different number. In their natural form as shown in Figure 2, these central bundles are secured together at the center as by a ring of tissue 14 and when the splitting is done, this inner ring of tissue 14 is also cut so as to separate the several bundles or columns 13 and thereby make it possible to open and flatten the entire skeleton whereupon, in transverse section, it will appear as shown in Figure 5.

It will be seen that the structure is such as to provide a series of hollow spaces or cavities 15 between adjacent bundles 13, the bundles and the cavities alternating around the skeleton.

Figure 4:
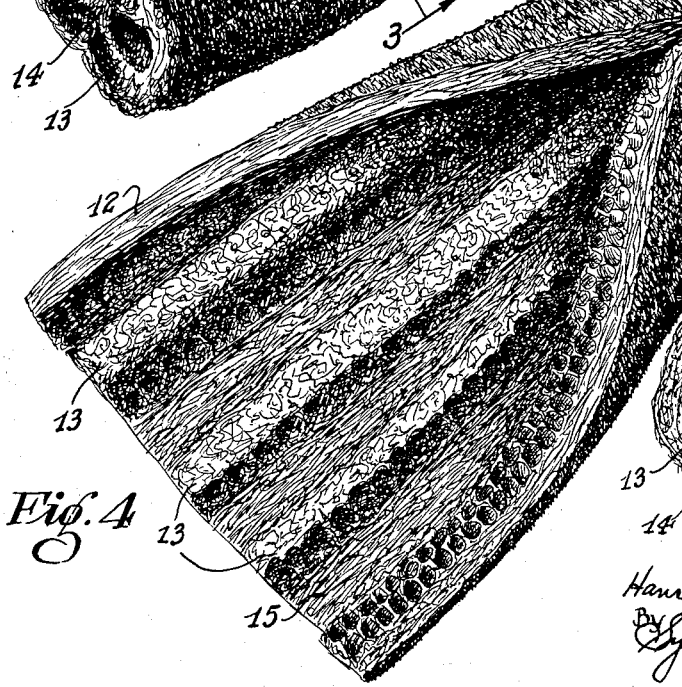
Figure 4 is a perspective view of a skeleton showing the manner in which I cut or split it longitudinally in preparing the article of my invention.
Figure 3:
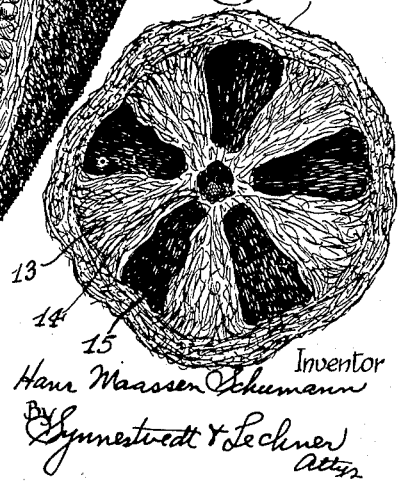
Figure 3 is a transverse section taken approximately as indicated by the line 3—3 on Figure 2.

In splitting the skeleton as shown in Figure 4, it will be understood, of course, that the cut is carried throughout the entire length of the skeleton but, in the figure, this has been shown as incompleted in order to better illustrate the nature of the procedure. At the same time the seeds carried by the skeleton are removed.

After the cutting has been completed and the seeds removed, the piece is spread out in substantially flat condition and placed in a drying chamber which, preferably, is held at a temperature ranging between 100° F. and 150° F. The drying, preferably, is accomplished in two stages and may be effected upon a suitable grating under fanned air. During the initial stage when the imbibed latex is still relatively fluid the grating may be subjected to a slight vibration which tends to aid the imbibition and consolidate the latex in and through the smaller tissues of the skeleton. During the later or second stage of the drying it is preferable to hold the sheet in its flat or spread-out form by applying over the top a suitable board or plate upon which a slight pressure may be exerted and during this stage the vibration is discontinued. This drying technique is particularly useful because during the first stage the latex is relatively fluid and to apply pressure at this time would tend to squeeze out of the tissues some of the latex which could be usefully retained. During the later stage, when the latex becomes relatively thick and well set, this danger is past so that the pressure can be applied in order to more firmly hold the piece in flat position.

Several different thicknesses of sheet are readily prepared as exemplified in Figures 6, 7 and 8, although other variations in thickness can readily be made by following the same general technique. In Figure 6 the entire body of each of the central vascular bundles 13 is cleanly cut away to leave only the outer fruit wall 12 which results in the production of a relatively thin sheet. In Figure 7 a thicker sheet is illustrated and this is formed by cutting off the inner or upper portions of the bundles 13 as shown in Figure 5 and fitting them as inserts 13a into the spaces between the remaining or base portions of the original bundles. Before the pieces 13a are fitted into position it is well to relatex them either by dipping, painting or spraying so that under the drying operation they will be firmly secured in position to yield the thicker piece illustrated in Figure 7.

Figure 8 shows a still further arrangement wherein bundles 13b are taken from another latex impregnated pericarp and introduced into the spaces 15 between the bundles 13 of the skeleton under treatment. Here again the inserted pieces 13b are relatexed if necessary so that during the drying operation they become firmly secured in postion to yield the still thicker piece illustrated in Figure 8.

It will be understood, of course, that sheets of any thickness which may be desired can easily be made by cutting off greater or lesser amounts of the portions 13 and interfitting the proper filler pieces or even a series of filler pieces into the spaces 15.

The final drying step is best accomplished under a somewhat higher pressure (sufficient to keep the pieces flat) and at a temperature lying somewhere between 100 and 150° F. and during this final drying, the pieces preferably should be held upon a grating or other support which is not vibrated. Of course, still higher drying temperatures can be used if desired just so long as they do not injure the tissues. I have sometimes used temperatures as high as 200° F. but these higher temperatures are not necessary for satisfactory results.

Figure 9 illustrates a finished sheet 16 which has been cut to a regular rectangular shape for the purpose of providing a conveniently sized and uniform article of trade.

In the preferred procedure described above, the skeletons 10 as received in commerce are first dried and then immediately plunged into a bath of latex. However, it is quite practical to vary the foregoing procedure by first taking the compressed skeleton 10 as receiving in commerce and soaking it in water until it regains its natural form and then drying it to remove all traces of the water after which it can be dipped or plunged into a bath of latex for the impregnation step as already described. This procedure somewhat affects the power or rate of the imbibition so that less latex is taken up then in the case where the skeleton is directly impregnated with the latex without prior soaking in water. In fact I have found that by controlling the degree of soaking in water, it is possible to control to some extent the degree of the subsequent imbibition of latex and in this way I can produce a finished product having varying quantities of latex in the tissues so as to meet a particular demand.

However, in both techniques, I wish to emphasize the fact that the latex is carried in all directions by virtue of the nature of the fibers of the skeleton and in the resulting article the original porosity of the fibrous mass of the pericarp is largely retained but with a tremendous increase in its elasticity, resilience, toughness and resistance to wear.

As pointed out above, my invention makes it possible to provide a material of the character described which can be bent or set to any desired configuration. This is done by applying additional latex and shaping the piece and firmly holding it in the desired form during drying of the latex whereupon the final product will retain the bend or the set which has been given to it and will regain its shape practically indefinitely no matter how many times it is distorted, pressed or stretched in service.

I should also point out that I have found it equally feasible to impregnate with either light or heavy latex. For some uses the light latex is preferable and for others the heavy latex. I would say, however, that the porosity of pieces impregnated with pieces of heavy latex is somewhat less than that of pieces impregnated with light latex.

While I prefer the method of impregnating with latex which has been described above, namely, the method which involves immersing or plunging the dry skeleton into a bath of latex, yet I would like to point out that it is possible to effect very satisfactory impregnation by a thorough painting or spraying treatment. In fact, by following a painting or spraying technique it is also possible, as will be obvious, to control the degree of penetration and imbibition of the latex. The details of all of these techniques can be considerably varied but experience in practice will quickly determine the procedure which will yield a product having the qualities desired for any particular field of usefulness.

The combination of qualities made possible by my invention is quite remarkable. For example the finished product is relatively light in weight yet extremely strong, tough and durable. It is also exceedingly porous, elastic and resilient. Furthermore the finished material is waterproof and non-slipping.

I claim:

1. The method of preparing the vascular tissue of the pericarpial skeleton of a plant of the genus Luffa which comprises drying the skeleton; in immersing the dried skeleton in a bath of latex; removing the skeleton from the bath and draining away excess latex; cutting the skeleton longitudinally, separating the vascular bundles from one another and spreading it out; and drying the opened skeleton.

2. The method of claim 1 wherein initial drying of the latex treated skeleton is accompanied with vibration of the skeleton and wherein the vibration is discontinued during final drying and setting of the latex.

3. The method of claim 1 where tissue from the vascular bundles is removed.

4. The method of claim 1 where inner portions of the vascular bundles are removed and secured between outer portions.

5. The method of claim 4 where the inner portions of the vascular bundles are treated with latex and secured by drying at a temperature of from 100° F. to 150° F.

6. The method of claim 1 where vascular bundles from another pericarp are secured in the spaces between the vascular bundles of the skeleton.

7. The method of claim 6 where the securing of the bundles is accomplished by treating them with latex and drying at a temperature of from 100° F. to 150° F.

8. The method of claim 1 wherein the latex treated skeleton is vibrated during drying.

9. The method of claim 8 wherein the drying of the latex is done at a temperature between 100° F. and 150° F.

10. As a new article, dry vascular tissue of the pericarpial skeleton of a plant of the genus Luffa impregnated with latex.

11. The article of claim 10 in substantially flat sheet form.

12. The article of claim 11 having the central vascular bundles of the skeleton removed.

HANS MAASSEN SCHUMANN.

REFERENCES CITED

The following references are of record in the file of this patent:

UNITED STATES PATENTS

| Number | Name | Date |
|---|---|---|
| 989,572 | Dash | Apr. 18, 1911 |
| 1,606,561 | Dash | Nov. 9, 1926 |
| 1,949,034 | Yamamoto | Feb. 27, 1934 |
| 2,141,708 | Elmendorf | Dec. 27, 1938 |
| 2,215,973 | Osborn | Sept. 24, 1940 |
| 2,245,202 | Crasno | June 10, 1941 |